(12) United States Patent
Holzbauer et al.

(10) Patent No.: US 9,888,802 B2
(45) Date of Patent: Feb. 13, 2018

(54) CENTRIFUGAL SEPARATOR FOR SEPARATING FRUIT OR VEGETABLE JUICE FROM FRUIT OR VEGETABLE PULP

(75) Inventors: Juergen Holzbauer, Maria Rain (AT); Theodoor Stolk, Langezwaag (NL); Klaas Kooijker, Drachten (NL); Heimo Obersteiner, Klagenfurt (AT); Haley Danielle Watson, Amsterdam (NL); Andreas Jacobus Louis Nijsen, Enschede (NL); Gertrude Riette Van Der Kamp, Groningen (NL); Jasper Boter, Zutphen (NL); Marjan Willeke Esther Cornelissen, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/232,653

(22) PCT Filed: Jul. 12, 2012

(86) PCT No.: PCT/IB2012/053572
§ 371 (c)(1),
(2), (4) Date: Oct. 25, 2017

(87) PCT Pub. No.: WO2013/011430
PCT Pub. Date: Jan. 24, 2013

(65) Prior Publication Data
US 2014/0151291 A1    Jun. 5, 2014

Related U.S. Application Data

(60) Provisional application No. 61/508,105, filed on Jul. 15, 2011.

(30) Foreign Application Priority Data

Jul. 15, 2011   (EP) ..................................... 11174092

(51) Int. Cl.
*A47J 19/02* (2006.01)
*A23N 1/00* (2006.01)

(52) U.S. Cl.
CPC .............. *A47J 19/027* (2013.01); *A23N 1/00* (2013.01)

(58) Field of Classification Search
CPC .......... A47J 19/02; A47J 19/027; A47J 19/06; A23L 2/04; A23L 2/06; A23N 1/00;
(Continued)

(56) References Cited

U.S. PATENT DOCUMENTS 1,953,714 A * 4/1934 Jenkins ................. A47J 19/027
                                                                99/511
2,840,130 A   6/1958 Schwarz
(Continued)

FOREIGN PATENT DOCUMENTS

CN     2822443 Y    10/2006
DE     1942225 A1 * 5/1970 ............ A47J 19/027
(Continued)

*Primary Examiner* — David C Mellon

(57) ABSTRACT

The present application relates to a centrifugal separator for separating fruit or vegetable juice from fruit or vegetable pulp. The centrifugal separator comprises a body (22) configured to rotate about a central axis (24), a chamber (28) formed by the body (22) for receiving pulp and juice, and an elongate aperture (29) defined by and extending arcuately around the body (22). Therefore juice in the chamber (28) is urged to flow through the aperture (29) when the body (22) is rotated about the central axis. The present application also relates to a juicer for extracting fruit and or vegetable juice from fruit or vegetable pulp comprising a centrifugal separator.

13 Claims, 7 Drawing Sheets

(58) Field of Classification Search
CPC .. A23N 1/003; A23N 1/02; B04B 1/08; B04B 1/10; B04B 1/12; B01D 21/26; B01D 21/262
See application file for complete search history.

(56) References Cited

U.S. PATENT DOCUMENTS

| | | | | |
|---|---|---|---|---|
| 3,731,800 | A * | 5/1973 | Timson | B04B 5/12 209/155 |
| 4,034,664 | A | 7/1977 | Hassell | |
| 5,421,248 | A | 6/1995 | Hsu | |
| 5,534,118 | A * | 7/1996 | McCutchen | B01D 3/10 159/11.1 |
| 2005/0218062 | A1* | 10/2005 | Forman | B01D 61/08 210/321.68 |
| 2006/0175242 | A1* | 8/2006 | Dorian | A61M 1/0281 210/321.68 |
| 2007/0209528 | A1 | 9/2007 | Chang | |
| 2008/0314261 | A1 | 12/2008 | Hensel | |
| 2009/0235831 | A1 | 9/2009 | Nisonov | |
| 2012/0048127 | A1* | 3/2012 | Huang | A47J 19/027 99/503 |

FOREIGN PATENT DOCUMENTS

| | | |
|---|---|---|
| DE | 4428014 C2 | 11/1996 |
| EP | 0988818 A2 | 9/1999 |
| EP | 1586259 B1 | 7/2007 |
| EP | 2198755 A1 | 6/2010 |
| EP | 2086376 B1 | 7/2010 |
| EP | 2272407 A1 | 1/2011 |
| JP | 11984095924 U | 6/1984 |

* cited by examiner

CENTRIFUGAL SEPARATOR FOR SEPARATING FRUIT OR VEGETABLE JUICE FROM FRUIT OR VEGETABLE PULP

CROSS-REFERENCE TO PRIOR APPLICATIONS

This application is the U.S. National Phase application under 35 U.S.C. § 371 of International Application No. PCT/IB2012/053572, filed on Jul. 12, 2012, which claims the benefit of U.S. Provisional Patent Application No. 61/508,105, filed Jul. 15, 2011 and European Patent Application No. 11174092.4, filed on Jul. 15, 2011. These applications are hereby incorporated by reference herein.

FIELD OF THE INVENTION

The present invention relates to a centrifugal separator for separating fruit or vegetable juice from fruit or vegetable pulp. Furthermore, the present invention also relates to a juicer for extracting fruit and or vegetable juice from fruit or vegetable pulp comprising a centrifugal separator.

BACKGROUND OF THE INVENTION

Juicers for foodstuffs, such as fruit or vegetables, are known for separating juice from pulp. Such apparatus are highly popular because of their health and taste benefits. One form of juicer is a centrifugal juicer.

A centrifugal juicer is shown in FIG. 1. Such a juicer 1 comprises a housing 2 with a rotating body 3 which is rotatably mounted in the housing 2. The rotating body 3 comprises a base 4, a grater 5 mounted on an upper surface of the base 4 and a sieve 6 upstanding around the periphery of the base 4 and diverging outwardly in a conical shape to form a fruit or vegetable receiving chamber 7. A cylindrical guide 8 feeds fruit into the chamber 7, a juice outlet 9 is formed around the outer face of the sieve 6 to receive juice urged through the sieve 6, and a pulp outlet 11 is formed at the upper end of the sieve 6 to receive pulp urged from the chamber 7.

When the rotating body 3 is rotated by a motor 12, the sieve 6 and grater 5 are rotated. A fruit or vegetable inserted into the juicer is guided by the guide 8 onto the grater 5 and reduced to pulp and juice. The pulp and juice is then urged radially outwards by the centrifugal force of the rotating body 3. The sieve 6 has a plurality of perforations or holes 13 in it through which juice is urged to flow, but the pulp is retained in the body 3 so that the juice separated from the pulp and flows into the juice outlet 9. The pulp retained in the chamber 7 and is urged upwardly towards the pulp outlet 11.

However, a recognised problem of a centrifugal juicer is that it is difficult and time consuming for a user to clean. In particular, the fibres of the pulp get stuck in the perforations of the sieve and so a user has to brush the sieve by hand to clean it.

Furthermore, it is known that the size of the perforations or holes formed through the sieve are generally greater in diameter than the size of the pulp particles from which juice is to be separated. With a conventional sieve, the inner surface of the sieve is quickly covered with fibres so that the initial fibres cover the holes in the sieve, and themselves become the sieve. This is known in the industry as cake filtration process. However, it will be appreciated that the sieve only works when dirty and such an arrangement is inefficient as the fibres coat the whole of the sieve, and so the effectiveness of the sieve is reduced as the sieve does not work until its inner surface has been thoroughly covered in pulp.

SUMMARY OF THE INVENTION

Therefore, it is an object of the invention to provide a centrifugal separator for separating fruit or vegetable juice from fruit or vegetable pulp and/or a juicer for extracting fruit and or vegetable juice which substantially alleviates or overcomes the problems mentioned above.

According to the present invention, there is provided a centrifugal separator for separating fruit or vegetable juice from fruit or vegetable pulp comprising a body configured to rotate about a central axis, a chamber formed by the body for receiving pulp and juice, and an elongate aperture defined by and extending arcuately around the body, so that juice in the chamber is urged to flow through the aperture when the body is rotated about the central axis.

The above arrangement enables juice to be extracted from a fruit or vegetable pulp without the need for a sieve. This simplifies the arrangement of a centrifugal separator and makes a centrifugal separator easier to clean.

Conveniently, the elongate aperture extends circumferentially around the body.

Therefore, the flow of juice from the chamber is possible all the way around the body.

At least a portion of the elongate aperture may extend in a direction having an axial component along the body.

At least a portion of the elongate aperture may extend in an axial direction along the body.

The path of the elongate aperture around the body may define a wave shape.

The body may comprise a first part and a second part, wherein the first and second parts are separable along the aperture.

The effect of this arrangement is that it enables the aperture to be easily cleaned, and prevents fibres from being trapped in the aperture during cleaning Advantageously, the first part is a circular plate and the second part is a circumferentially extending wall upstanding from the first part.

In one embodiment, a face of the first part and a face of the second part are configured to be spaced from each other to form the aperture.

An advantage of the above arrangement is that assembly of the centrifugal separator is simplified.

The face of the first part and the face of the second part may be configured so that the path of fluid through the aperture is in a substantially radial direction.

The first part may be a plate and the second part may be a circumferentially extending wall upstanding from the first part.

The face of the first part and the face of the second part may be configured so that the path of fluid through the aperture is in a substantially circumferential direction. A section of the first part may overlap a section of the second part.

The aperture may communicate with a channel configured to guide juice from the aperture to outside the body.

The channel may be formed between the first and second parts and/or through the second part.

The distance between the upper face of the first part and a lower face of the second part may be about 0.3 mm.

An advantage of this arrangement is to produce a good flow of juice through the aperture, together with a cake filtration process at the aperture.

Conveniently, a spacer means may upstand from the first or second part and may locate against the corresponding first or second part to space the second part from the first part.

One advantage of this arrangement is that it ensures that a consistent aperture gap is maintained.

The aperture may further comprise a converging mouth portion.

The above arrangement urges pulp fibres to converge towards the aperture and so increases the efficiency of the cake filtration process.

The first part may further comprise a circumferentially extending rim, and the face of the first part may be formed by the rim.

Advantageously, an inner edge of the rim may be inclined to form the converging mouth portion.

An advantage of this feature is to simplify the arrangement of the body to form the converging mouth portion.

Conveniently, the second part may further comprise a circumferentially extending flange, and the face of the second part is formed by the circumferentially extending flange.

In one embodiment, the second part may converge inwardly away from a lower end proximate the first part to an upper end.

The above arrangement urges the pulp and juice in the chamber back towards the aperture to ensure a good juice extraction efficiency.

Advantageously, the upper end of the second part is open so that pulp is able to flow from the chamber.

One advantage of this arrangement is that pulp is easily guided from the chamber.

One embodiment of the centrifugal separator further comprises a stationary fin mounted in the chamber formed by the body such that an edge of the fin is configured to scrape pulp on an inner surface of the body.

Therefore, the flow of pulp in the chamber can be guided as desired.

According to another aspect of the invention, there is provided a juicer for extracting fruit and or vegetable juice from pulp comprising a centrifugal separator according to any preceding claim.

The invention could also be applied in relation to a soymilk maker, wherein the soymilk maker comprises a centrifugal separator for separating soymilk from soy pulp comprising a body configured to rotate about a central axis, a chamber formed by the body for receiving pulp and juice, and an elongate aperture defined by and extending along the body, so that soy milk in the chamber is urged to flow through the aperture when the body is rotated about the central axis.

Any embodiment of the invention relating to juicers may also be applicable in the field of soy milk making These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 2:
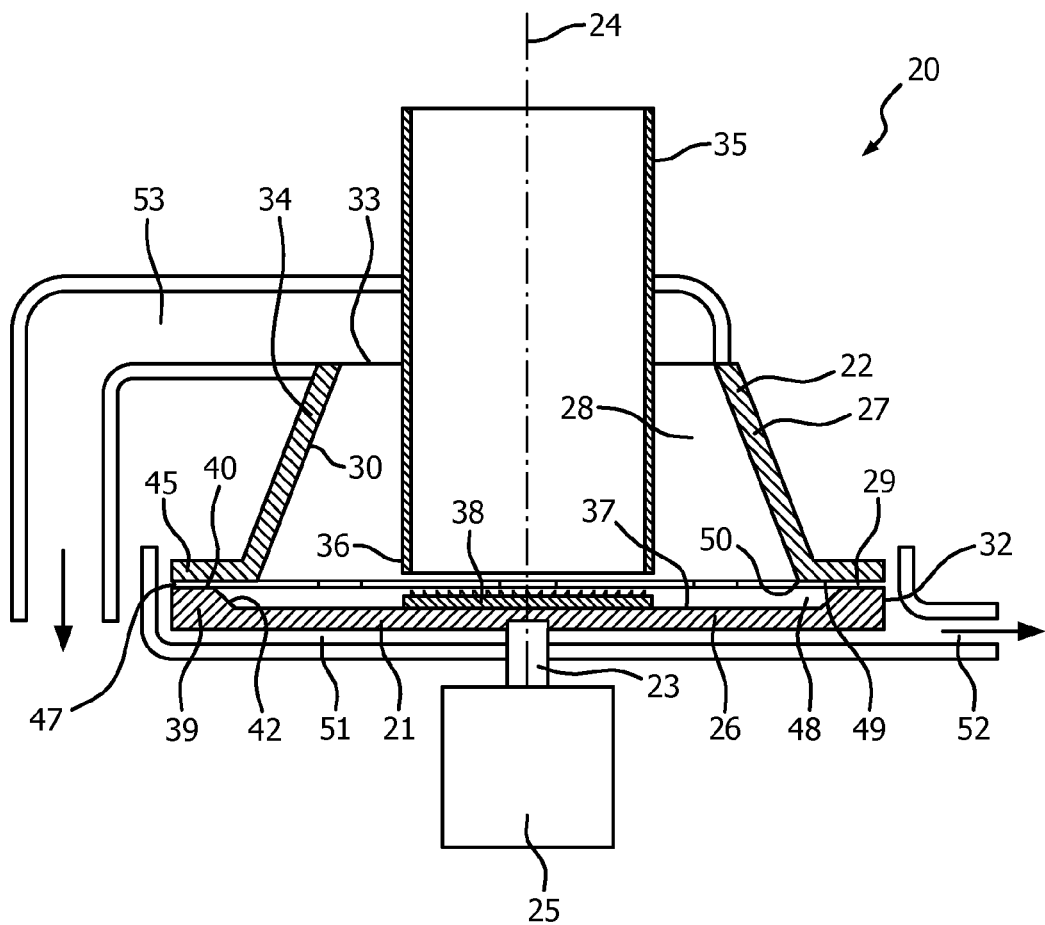
FIG. 2 shows an illustrative cross-sectional view of a centrifugal separator for separating a fruit or vegetable juice from a pulp according to an embodiment of the invention.

Referring now to FIG. 2, a centrifugal separator 20 acting as a centrifugal juicer for separating fruit or vegetable juice from pulp is shown comprising a housing 21 and a rotatable body or drum 22 disposed in the housing 21.

The rotating body or drum 22 is rotatably mounted in the housing 21 by a shaft 23. The shaft 23 extends downwardly through the housing from the rotating body 22 to define a vertical rotational axis 24. The shaft 23 is driven by a motor 25 in a conventional manner, so that the shaft 23, and therefore the rotating body 22, is rotated when the motor 25 is operated.

Figure 3:
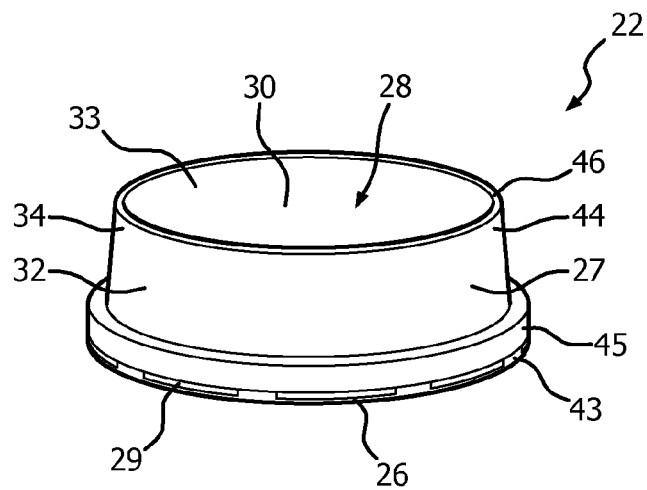
FIG. 3 shows a perspective view of a rotating body of the centrifugal separator shown in FIG. 2.

The rotating body 22 is shown in FIGS. 2 and 3 and comprises a base part 26 and an upper part 27. The upper part 27 upstands from and extends around the periphery of the base part 26, and together they form a juice and pulp receiving chamber 28. An elongate aperture 29, acting as a fluid passage, is formed between the base part 26 and the upper part 27, and extends arcuately around the rotating body 22. The aperture 29 has an elongate opening which opens to the juice and pulp receiving chamber 28. The elongate opening extends circumferentially around the rotating body 22. The elongate aperture 29 extends through the rotating body 22 from an inner surface 30 to an outer surface 32 of the rotating body 22 so that the juice and pulp receiving chamber 28 fluidly communicates with the exterior of the rotating body 22. The juice and pulp receiving chamber 28 is open at an upper end 34 of the rotating body 22, forming a hole 33 through which fruit and or vegetables are inserted into the juice and pulp receiving chamber 28, and pulp is discarded from the chamber 28, as will become apparent hereinafter.

A guide 35 is disposed above and is received through the open upper end 34 such that it extends into the juice and pulp receiving chamber 28. The guide 35 is cylindrical and a lower end 36 of the guide 35 is spaced from an upper face 37 of the base part 26 so that a space is provided between the upper face 37 of the base part 26 and the guide 35 so that pulp and juice can flow therebetween, as will become apparent hereinafter.

A grater 38 is fixedly mounted to the top surface 37 of the base part 26 by bolts (not shown), although alternative fixing means may be used. The grater 38 has a plurality of blades extending upwardly to face the guide 35 to grate fruit and/or vegetables inserted into the juice and pulp receiving chamber 28 through the guide 35. It will be appreciated that the guide 35 is positioned above the grater 38, so that fruit and/or vegetables inserted into the guide 35 are guided onto the grater 38.

Figure 4:
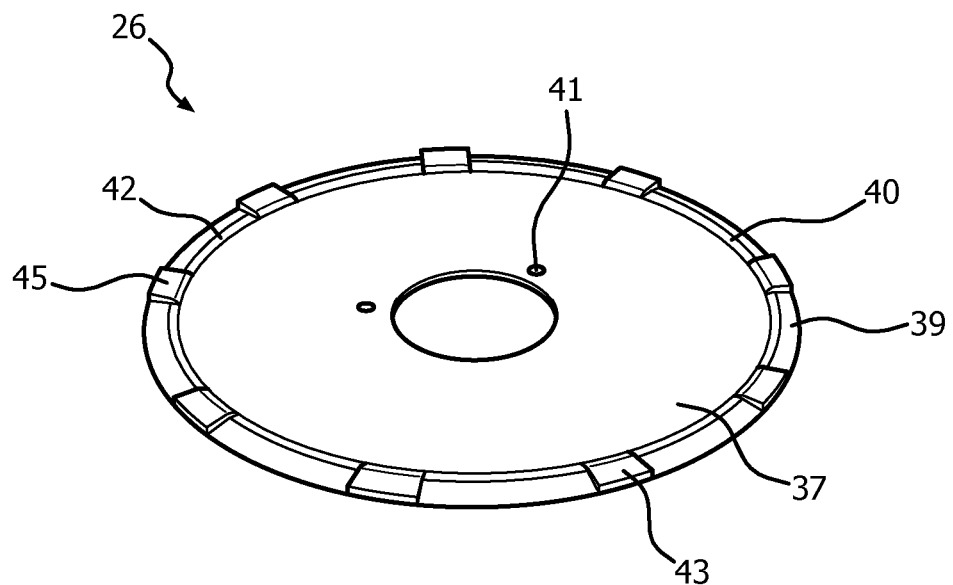
FIG. 4 shows a first portion of the rotating body shown in FIG. 3.

Referring to FIG. 4, the base part 26 of the rotating body 22 is shown. The base part 26 is circular and has an upstanding outer rim 39 around its periphery. The rim 39 has a planar upper face 40 which extends parallel to the base top surface 37 and transverse to the axis of rotation of the rotating body 22. The upper face 40 of the rim 39 forms the upper face of the base part 26. An inner edge 42 of the rim 39 is inclined such that the inner edge 42 diverges outwardly from the top surface 37 of the base part 26 to the upper face 40 of the rim 39. Mounting holes 41 extend through the base top surface 37 to mount the grater 38 thereto.

Spacer elements 43 upstand from the upper face 40 of the rim 39. The spacer elements 43 act as a spacing means to space the upper face 40 of the rim 39 from a lower face 49 (refer to FIG. 2) of the upper part 27, as will become apparent hereinafter. The spacer elements 43 are disposed at regular intervals around the rim 39. Nine spacer elements 43 are shown in FIG. 4, however it will be appreciated that the number of spacer elements is not limited thereto. Although the spacer elements upstand from the base part 26, it will be appreciated that the spacer elements may extend from the lower face 49 of the upper part 27 and locate against the base part 26.

Three of the spacer elements have locating recesses 45 formed therein to receive corresponding locating keys (not shown) which protrude from the lower face 49 of the upper part 27 to correctly position the base and upper parts 26,27 with respect to each other. It will be appreciated that the number of spacer elements 43 having locating recesses 45 formed therein may be varied.

Figure 5:
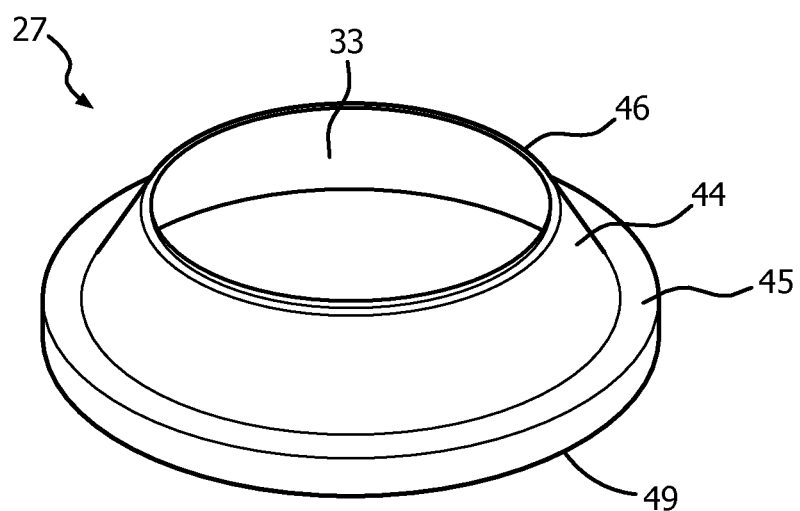
FIG. 5 shows a second portion of the rotating body shown in FIG. 4.

The upper part 27 is shown in FIG. 5 and comprises a conical portion 44 and a flange portion 45 extending out from a periphery of the conical portion 44. The conical portion 44 extends from the lower flange portion 45 to an upper edge 46. Therefore, the wall of the upper part 27 converges inwardly from the flange portion 45 to the upper edge 46. Alternatively, the wall of the upper part 27 may diverge outwardly from the flange portion 45 to the upper edge 46, so that the inner surface 30 of the rotating body 22 converges or expands away from the aperture 29, acting as a fluid passage.

The lower face 49 of the upper part 27 is formed by the flange portion 45 and has an outer edge 47 with a diameter corresponding to the outer edge of the rim 39. A lower inner edge 50 of the upper part lower face 49 has a smaller diameter than the inner edge 42 of the rim 39, so that a circumferentially extending recess is formed by the opposing lower face 49 of the upper part 27 and the base top surface 37, and the inner edge 42 of the rim 39 when the base and upper parts 26, 27 are brought together. The inclined inner edge 42 of the rim 39 means that the recess converges towards the aperture 29, acting as a fluid passage, to form a funnel-shaped mouth 48 to the aperture 29 which extends circumferentially around the inner surface 30 of the rotating body 22.

Although the above embodiment has a funnel-shaped mouth to the aperture, it will be appreciated that in an alternative embodiment the funnel shaped mouth is omitted. An advantage of the funnel-shaped mouth 48 is that the inclined inner edge 42 of the rim 39 urges pulp fibres to converge towards the aperture 29 and so increases the efficiency of the cake filtration process. Although the base part 26 has a peripheral rim 39, it will be appreciated that in an alternative embodiment the base part 26 does not have a rim extending therearound. Alternatively, or as well as, the lower inner edge 47 of the upper part lower face 49 has an inclined surface to form the funnel shaped mouth 48 to funnel the pulp fibres towards the aperture 29.

When the base and upper parts 26, 27 are assembled together the lower face 49 of the upper part 27 is brought together with the rim upper face 40 such that they extend parallel to, but spaced from, each other. The spacer elements 43 maintain a uniform spacing between the base and upper parts 26,27 so that the aperture 29 has a uniform spacing therearound. In the present embodiment the width of the aperture 29 between the lower face 49 of the upper part 27 and the rim upper face 40 is approximately 0.3 mm, although it will be appreciated that the width of the aperture 29 may be varied, for example the width of the aperture may be 0.1 mm. The lower face 49 of the upper part 27 and the rim upper face 40 are spaced from each other so that the width of the aperture 29 is in the range of 0.1 mm to 0.5 mm. It will be understood that the width of the aperture 29 is dependent on the desired product to be separated and the rate at which the rotating body 22 is configured to rotate about its axis.

Although the lower face 49 of the upper part 27 and the rim upper face 40 are shown extending parallel to, but spaced from, each other it will be appreciated that in cross-section (as shown in FIG. 2) the width of the aperture 29 between the lower face 49 of the upper part 27 and the rim upper face 40 may vary in a radial direction between the opening to the aperture 29 and an outer exit to the aperture 29, so that the width of the aperture 29 increases or decreases from the opening to the exit in a radial direction. The width of the aperture from the opening to the exit in a radial direction may converge or diverge in a linear or non-linear manner, and so it will be understood that such cross-sectional increase or decrease in the width of the aperture may have a linear or non-linear mathematical function, as well as a continuous or discontinuous mathematical function. Alternatively, the aperture has a labyrinth arrangement in cross-section.

Figure 1:
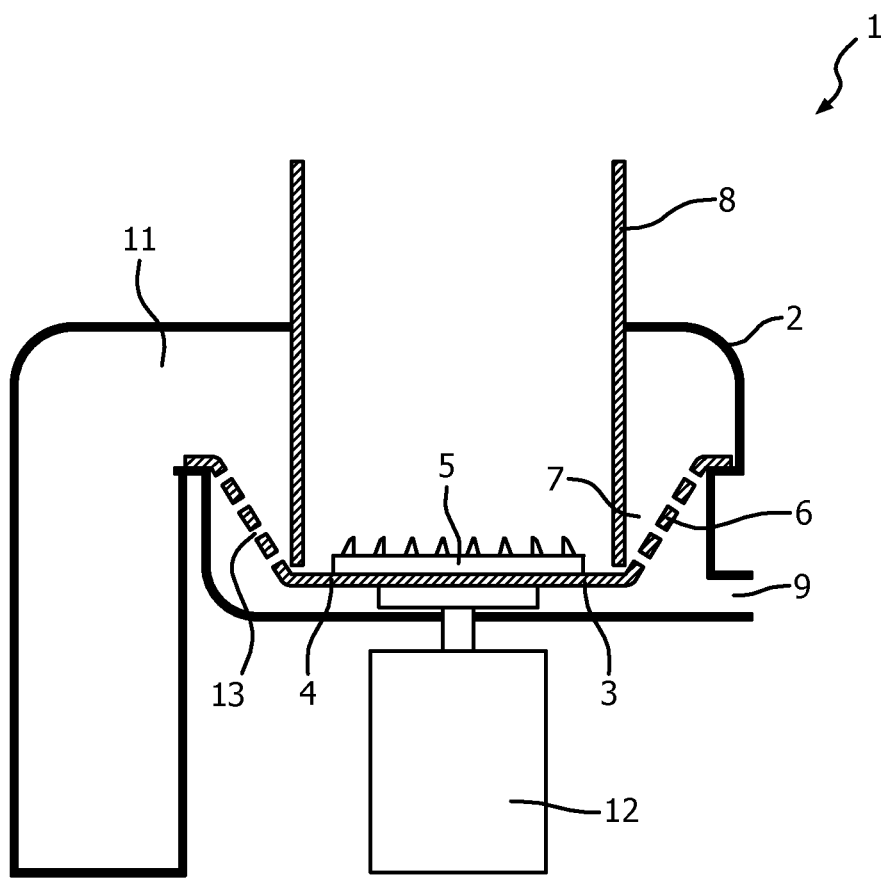
FIG. 1 shows an illustrative cross-sectional view of a conventional centrifugal juicer for separating a fruit or vegetable juice from a pulp.

The housing 21 defines a juice chamber 51 in which the rotating body 22 is received. The shaft 23 extends through a lower wall of the housing 21 and is connected to the motor 25. Although in FIG. 1 the shaft 23 is directly driven by the motor 25, it will be appreciated that other driving means are envisaged for rotating the rotating body 22. The juice chamber 51 has walls which extend above the aperture 29 to enclose the aperture 29 so that juice urged radially outwards through the aperture flows into the juice chamber 51. Therefore, the juice chamber 51 defines a juice outlet 52.

The housing 21 also defines a pulp outlet 53 which extends from the upper end 34 of the rotating body upper part 27 so that pulp urged through the open upper end 34 flows along the pulp outlet 53 and can be removed.

When the juice separator is assembled, the rotating body 22 is received in the housing 21 and the guide 35 is received through the open upper end 34 of the rotating body 22. The user then operates the juice separator so that the rotating body 22 is driven by the motor 25 and rotates in the housing 21 at high speed about the vertical rotational axis 24.

A fruit or vegetable is inserted into the guide 35 at an upper end, and is guided onto the grater 38. As the grater 38 forms part of the rotating body 22, the grater is rotating and so the blades of the grater 38 break the inserted fruit or vegetable down to combined pulp and juice. The rotation of the body 22 causes a centrifugal force on the combined pulp and juice and urges it to move radially outwardly. Therefore, the pulp and juice flows in the juice and pulp receiving chamber 28 through the gap between the guide 35 and the base part 26 towards the inner surface 30 of the rotating body 22.

The pulp is urged radially outwards due to the centrifugal force imparted on it by the rotating body 22. As the pulp flows outwardly, the funnel shaped mouth 48 funnels the pulp towards the aperture 29. Therefore, the mouth 48 to the aperture 29 is quickly filled with pulp and so a cake filtration process is achieved much more quickly than with a conventional sieve.

Furthermore, the funnel shaped mouth 48 to the aperture 29 guides the juice to the aperture, and it has been found that a single circumferentially extending aperture, acting as a fluid passage, is sufficient to allow the juice in the juice and pulp receiving chamber 28 to flow to the juice outlet 52, without the need for further apertures. Therefore, the arrangement of the rotating body is simplified in comparison to conventional centrifugal juicers.

As the rotating body 22 continues to rotate, pulp and juice is urged to flow in a radial direction. The pulp builds up in the funnel-shaped mouth 48, and the juice is urged to flow in a radial direction through the pulp in the funnel-shaped mouth 48, along the aperture 29 between the base and upper parts 26, 27, and into the juice outlet 52. The pulp is prevented from flowing through the circumferentially extending aperture 29 by the existing pulp fibres in the funnel-shaped mouth 48, however the juice is able to flow through the pulp along the aperture 29 and into the juice outlet 52.

The converging inner surface of the upper part 27 guides the pulp and juice downwardly towards the funnel shaped mouth 48, and juice filters radially outwardly through the pulp. However, excess pulp in the pulp and juice receiving chamber 28 is able to flow upwardly along the inner surface of the chamber 28 and through the open upper end 34 of the upper part 27, such that the excess pulp flows into the pulp outlet 53 and is removed from the chamber 28. Therefore, the pulp and juice are separated from each other.

Although in the present arrangement the inner surface 30 of the upper part 27 converges inwardly from the flange portion 45 to the upper edge 46, it will be appreciated that in an alternative embodiment the inner surface 30 of the upper part may be cylindrical, have one section that converges inwardly with another section that diverges outwardly, have a non-linear cross sectional profile, and/or one or more steps formed therein.

When the desired amount of juice has been obtained the motor is stopped and the rotating body 22 stops rotating. The rotating body 22 is then removable from the housing 21. To clean the rotating body 22, the upper part 27 is drawn away from the base part 26. Therefore, the opposing lower face 49 of the upper part 27 and the upper face 40 of the base rim are separated which means that the faces forming the aperture are able to be cleaned without a user needing to clean within the aperture itself. Access to the inner surface of the rotating body is also simplified.

Although in the above embodiment the upper part 27 and base part 26 are separable, in another embodiment it will be appreciated that the upper and base parts may be integrally formed. However, an advantage of the upper and lower portions being separable is that the two portions and the aperture formed therebetween are easily cleaned.

Figure 6:
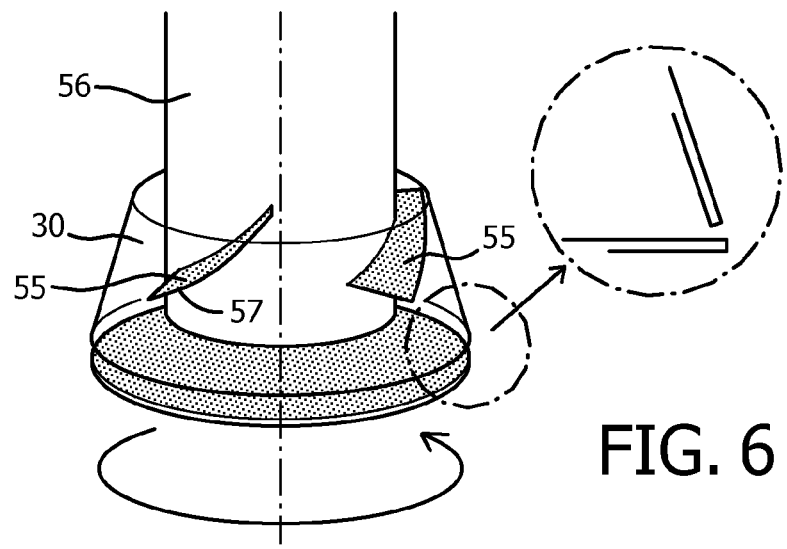
FIG. 6 shows an illustrative perspective view of a centrifugal separator for separating a fruit or vegetable juice from a pulp according to another embodiment of the invention.

Referring to FIG. 6, an alternative embodiment of a centrifugal juicer is described. This embodiment is generally the same as the above described embodiment, and a detailed description will be omitted herein and components and features will retain the same reference numerals. However, in the present embodiment the rotating body 22 has three helical fins 55 extending outwardly from an outer surface 56 of the guide 35. An outer edge 57 of each fin 55 lies against the inner surface 30 of the upper part 27. Therefore, as the rotating body 22 is rotated, the outer edge 57 of each fin 55 scrapes along the inner surface 30 of the rotating body 22 to urge the excess pulp towards the open upper end 34 of the upper part 27. Although three helical fins are described, it will be appreciated that the number of fins is not limited thereto, and that an alternative number of fins may be used. Furthermore, the fins may not be helical.

In addition to, or as an alternative to, the fins being arranged to aid transport of the pulp out of the juice and pulp receiving chamber 28 they may also be positioned to transport some or all of the pulp back towards the base part 36 so that the pulp is juiced several times.

Furthermore, it will be appreciated that in another embodiment the fins are arranged to scrape pulp away from the aperture to prevent an excessive cake build-up of pulp which may cause a blockage of the aperture.

Advantages of the fins include that they can enhance juice output and improve operation of the juicer.

An alternative embodiment of a centrifugal juicer 60 will now be described with reference to FIG. 7. The centrifugal juicer 60 according to this embodiment is generally the same as the centrifugal juicer 20 described above, and so a detailed description will be omitted herein. Furthermore, components and features corresponding to components and features described in the forgoing embodiment will retain the same reference numerals.

Figure 7:
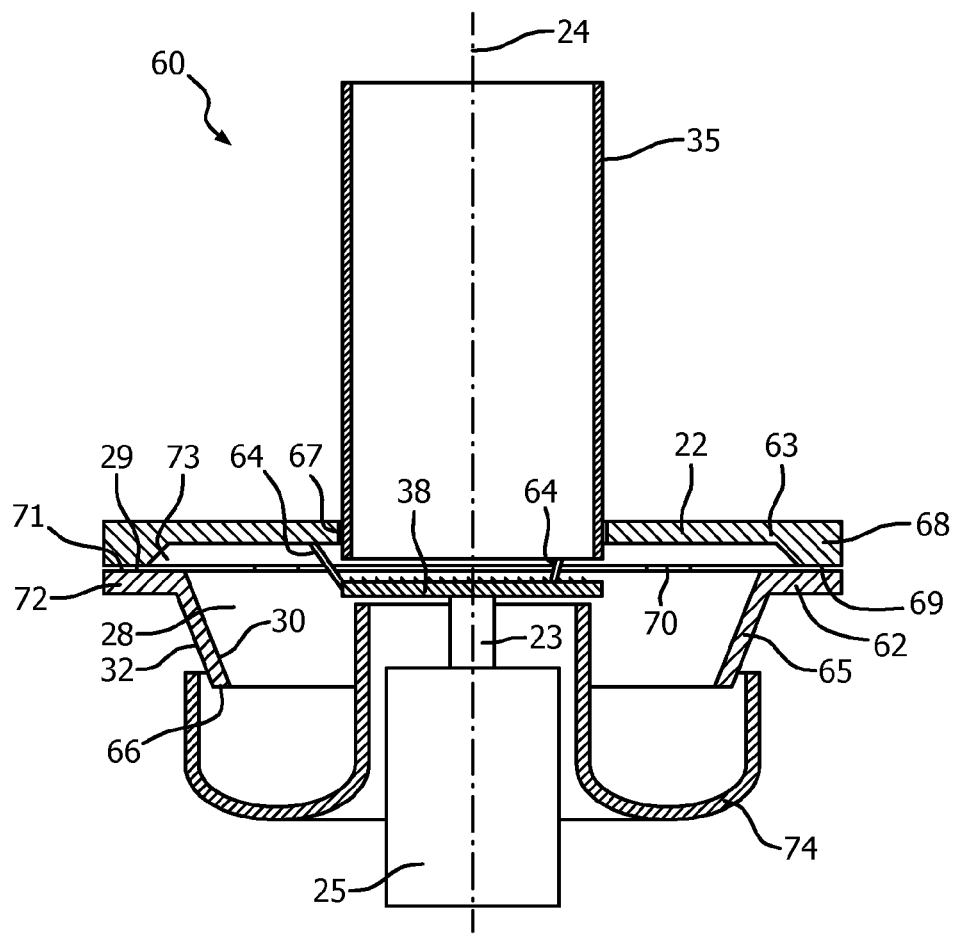
FIG. 7 shows an illustrative cross-sectional view of a centrifugal separator for separating a fruit or vegetable juice from a pulp according to a further embodiment of the invention.

Referring now to FIG. 7, the centrifugal separator 60 comprises a housing (not shown) and a rotating body 22 disposed in the housing.

The rotating body 22 is rotatably mounted in the housing and is mounted to a shaft 23 which is driven by a motor 25 in a conventional manner, so that the shaft 23, and therefore the rotating body 22, is rotated when the motor 25 is operated.

The rotating body 22 comprises a base part 62 and an upper part 63. The base part 62 has a circumferentially extending outer wall 65 which depends downwardly from and extends around the periphery of the upper part 63, and together they define a juice and pulp receiving chamber 28. An elongate aperture 29 is formed between the base part 62 and the upper part 63 which extends arcuately around the rotating body 22. The elongate aperture 29 extends through the rotating body 22 from an inner surface 30 to an outer surface 32 of the rotating body 22 so that the juice and pulp receiving chamber 28 fluidly communicates with the exterior of the rotating body 22.

A grater 38 is fixedly mounted to the end of the shaft 23 by known means (not shown) to grate fruit and/or vegetables inserted into the juice and pulp receiving chamber 28. The upper part 63 is mounted to the grater 38 by three stands 64 extending between the upper part 63 and the grater 38 so that, when the grater 38 is rotated by the shaft 23, the rotating body 22 is also rotated. Alternatively, the base part 62 is mounted to the grater 38 by three stands extending from a lower end 66 of the base part outer wall 65 and the grater 38 so that, when the grater 38 is rotated by the shaft 23, the rotating body 22 is also rotated.

A guide 35 is disposed through a hole 67 in the upper part 63 and extends into the juice and pulp receiving chamber 28. The guide 35 is cylindrical and a lower end 36 of the guide 35 is disposed over, but spaced from, the grater 38 so that fruit and/or vegetables inserted into the juice and pulp receiving chamber 28 through the guide 35 is guided into contact with the grater 38.

The upper part 63 is cylindrical and has an upstanding outer rim 68 around its periphery. The rim 68 has a planar lower face 69 which extends transverse to the axis of rotation of the rotating body 22. The lower face 69 of the rim 68 forms the lower face of the upper part 63.

Spacer elements 70 upstand from an upper face 71 of the base part 62 to space the upper face 71 from the lower face 69 of the lower face 69 of the rim 68. An upper end of each spacer element 70 releasably mounts to the upper part 63, for example by threadingly engaging therewith. Therefore, the upper and lower faces 71, 69 of the base and upper parts 62, 63 are mounted in a spaced relationship with each other, and the base part 62 is rotated along with the upper part 63. It will be appreciated that the spacer elements may also or instead extend from the lower face 69 of the upper part 63.

The base part 62 has a flange portion 72 which extends from a periphery of the upper end of the outer arcuate wall 65 of the base part 62. The outer arcuate wall 65 is conical and converges from its upper end to its lower end 66. Alternatively, the outer arcuate wall 65 may diverge outwardly from its upper end to its lower end.

The upper face 71 of the base part 62 is formed by the flange portion 72. A funnel-shaped mouth 73 to the aperture 29 is formed at the inner opening to the aperture 29 which extends circumferentially around the inner surface 30 of the rotating body 22.

Although the above embodiment has a funnel-shaped mouth to the aperture, it will be appreciated that in an alternative embodiment the funnel shaped mouth is omitted. An advantage of the funnel-shaped mouth 48 is that pulp fibres are urged to converge towards the aperture 29 and so increases the efficiency of the cake filtration process.

The base part 62 is open at its lower end 66 and a ring-shaped pulp receiving receptor 74 which is open at its upper end and is received below the lower end 66 of the base part 62 to receive excess pulp from the juice and pulp receiving chamber 28. An advantage of this arrangement is that the excess pulp is retained in the receptor 74 and so is easily removed and cleaned.

When the base and upper parts 62, 63 are assembled together the lower face 69 of the upper part 63 is brought together with the upper face 71 of the base part 71 such that they extend parallel to, but spaced from, each other. The spacer elements 70 maintain a uniform spacing between the base and upper parts 62, 63 so that the aperture 29 has a uniform spacing therearound.

Although the lower face 69 of the upper part 63 and the upper face 71 of the base part 62 are shown extending parallel to, but spaced from, each other in a circumferential direction, it will be appreciated that in cross-section (as shown in FIG. 7) the width of the aperture 29 may vary in a radial direction between the opening and an outer exit to the aperture 29, so that the width of the aperture 29 increases or decreases in a radial direction. The width of the aperture in a radial direction may converge or diverge in a linear or non-linear manner, and so it will be understood that such cross-sectional increase or decrease in the width of the aperture may have a linear or non-linear mathematical function, as well as a continuous or discontinuous mathematical function. Alternatively, the aperture has a labyrinth arrangement in cross-section.

When the juice separator is assembled, the rotating body 22 is received in the housing. The user then operates the juice separator so that the rotating body 22 is driven by the motor 25 and rotates in the housing 21 at high speed about the vertical rotational axis 24.

A fruit or vegetable is inserted into the guide 35 at an upper end, and is guided onto the rotating grater 38, which breaks said vegetable or fruit down to combined pulp and juice. The rotation of the body 22 causes a centrifugal force on the combined pulp and juice and urges it to move radially outwardly. Therefore, the pulp and juice flows in the juice and pulp receiving chamber 28 towards the inner surface 30 of the rotating body 22.

The pulp is urged radially outwards due to the centrifugal force imparted on it by the rotating body 22. As the pulp flows outwardly, the funnel shaped mouth 73 funnels the pulp towards the aperture 29. Therefore, the mouth 73 to the aperture 29 is quickly filled with pulp and so a cake filtration process is achieved much more quickly than with a conventional sieve.

Furthermore, juice is guided to the aperture, and it has been found that a single circumferentially extending aperture is sufficient to allow the juice in the juice and pulp receiving chamber 28 to flow out of the rotating body without the need for further apertures or a sieve like arrangement. Therefore, the arrangement of the rotating body is simplified in comparison to conventional centrifugal juicers.

As the rotating body 22 continues to rotate, pulp and juice is urged to flow in a radial direction. The pulp builds up in the funnel-shaped mouth 73, and the juice is urged to flow in a radial direction through the pulp in the funnel-shaped mouth 73 and along the aperture 29 between the base and upper parts 62, 63. The pulp is restricted from flowing through the circumferentially extending aperture 29 by the existing pulp fibres in the funnel-shaped mouth 73, however the juice is able to flow through the pulp along the aperture 29.

Excess pulp in the pulp and juice receiving chamber 28 is collated in the ring-shaped pulp receiving receptor 74 received below the lower end 66 of the base part 62, such that the pulp and juice are separated from each other. An advantage of this arrangement is that the desired product, namely the juice, flows from the rotating body to be collected in the housing for use, whereas the waste product, the pulp, is collected in one place in the ring-shaped receptor 74 directly underneath the rotating body. This is more aesthetically pleasing for a user, and makes the apparatus easier to clean as the pulp is retained in the pulp and juice receiving chamber 28.

When the desired amount of juice has been obtained the motor is stopped and the rotating body 22 stops rotating. The rotating body 22 is then removable from the housing 21. To clean the rotating body 22, the upper part 63 is drawn away from the base part 62 so that the aperture is easily cleaned and access to the and juice receiving chamber 28 is also simplified.

Figure 8:
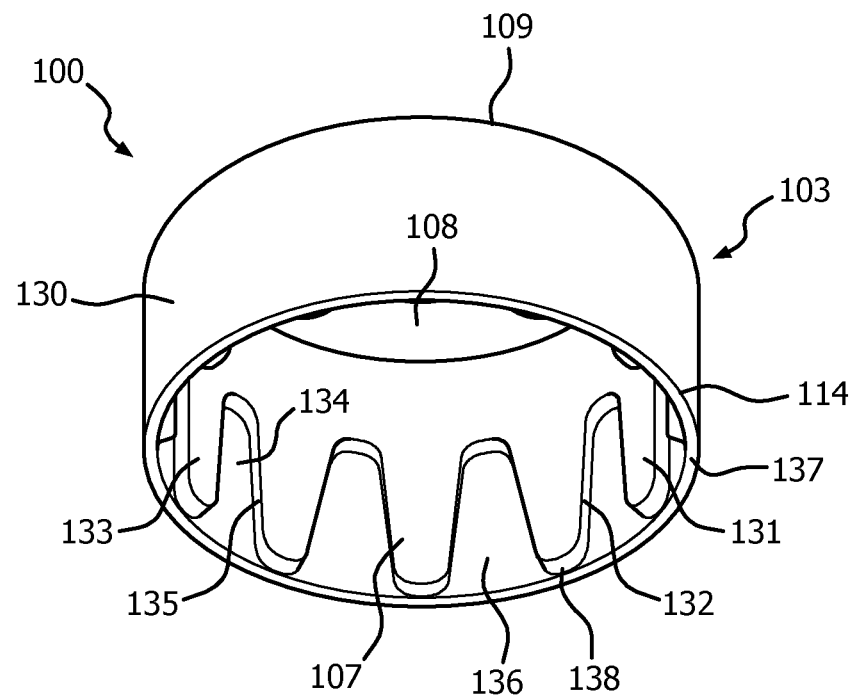
FIG. 8 shows an exploded perspective view of a rotating drum of a centrifugal seperator according to another embodiment of the invention.
Figure 8:
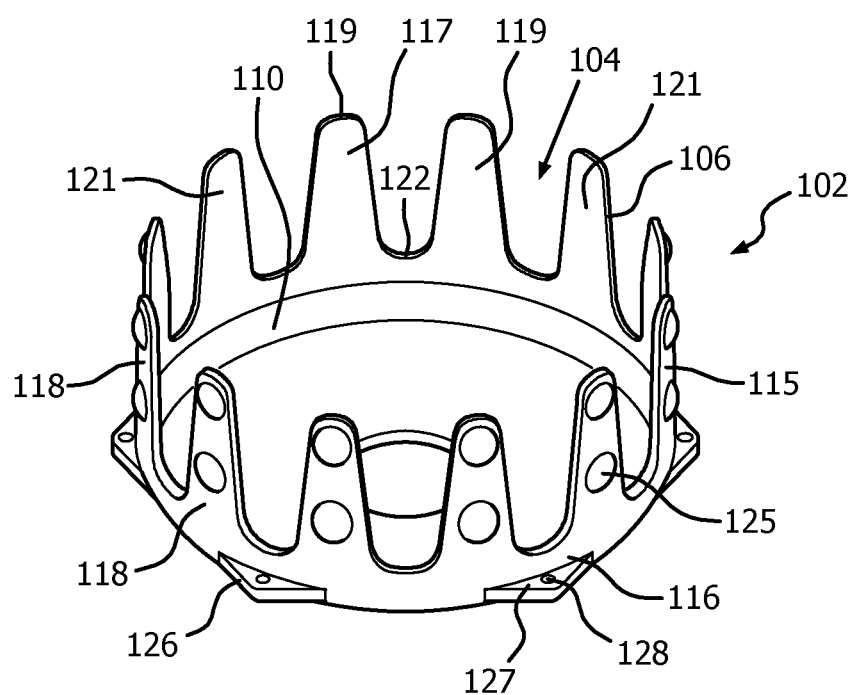
Figure 9:
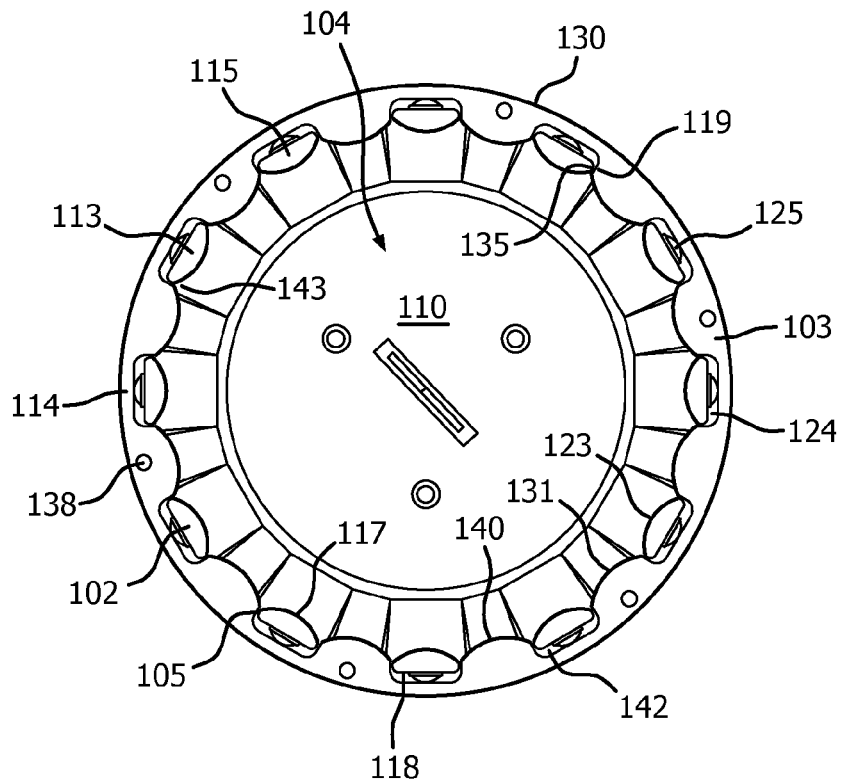
FIG. 9 shows a cross-sectional plan view of the rotating drum shown in FIG. 8.
Figure 10:
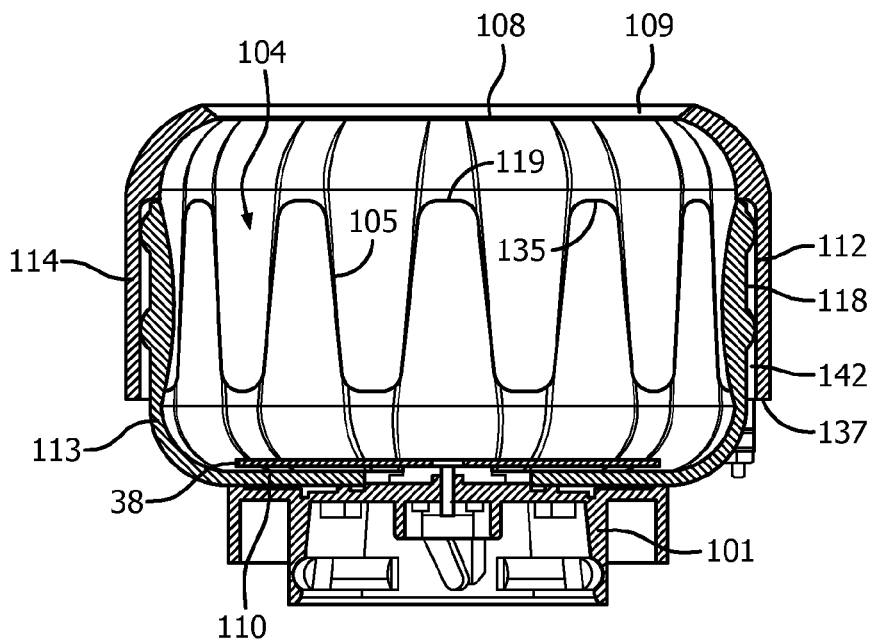
FIG. 10 shows a cross-sectional side view of the rotating drum shown in FIG. 9.

Referring now to FIGS. 8 to 10, an alternative form of a rotating drum 100 for a centrifugal seperator acting as a centrifugal juicer for separating fruit or vegetable juice from pulp will now be described. Reference numerals are retained from the above-described embodiments. The arrangement and configuration of many of the components and features are generally the same as described above, and so a detailed description will be omitted herein.

Referring now to FIG. 8, the rotating body or drum 100 is shown which is arranged to be rotatably mounted in the centrifugal separator acting as a centrifugal juicer for separating fruit or vegetable juice from pulp. The centrifugal seperator is generally the same as the centrifugal seperator described above and so a detailed description will be omitted herein. The rotating body 100 is disposed in the housing 21 (refer to FIG. 2) and is removable therefrom. Therefore, cleaning of the rotating body 100 and housing is simplified. Furthermore, the rotating bodies 22, 100 may be interchangably mounted in the housing.

The rotating body 100 is rotatably mounted in the housing 21 by a shaft 23 (refer to FIG. 2). A mounting unit 101 is shown in FIG. 10 which is configured to fixedly mount the rotating body 100 to the shaft 23. The rotating body 100 is removably mounted to the shaft 23. The shaft 23 extends downwardly through the housing 22 to define a vertical rotational axis 24. The rotating body 100 rotates about the rotational axis which extends through the centre of the rotating body 100. The shaft 23 is driven by a motor 25 in a conventional manner, so that the shaft 23, and therefore the rotating body 100, is rotated when the motor 25 is operated.

The rotating body or drum 100 is shown in FIGS. 8 to 10 and comprises a base part 102 and an upper part 103. The upper part 103 overlaps and extends around the base part 102. The base and upper parts 102, 103 together form a juice and pulp receiving chamber 104.

An elongate aperture 105, acting as a fluid passage, is formed between the base part 102 and the upper part 103, and extends arcuately around the rotating body 100 when the rotating body is assembled. The aperture 105 has an elongate opening which opens to the juice and pulp receiving chamber 104. The elongate opening extends circumferentially around the rotating body 100. The aperture 105 is defined by opposing edges 106, 107 of the base part 102 and upper part 103 respectively. The opposing edges 106, 107 defining the aperture 105 are spaced from each other to provide a gap therebetween. The aperture 105 acts as a fluid passage. The aperture, acting as a fluid passage, defines part of a fluid path which extends through the rotating body 100 from the juice and pulp receiving chamber 104 to the exterior of the rotating body 100. Therefore, the juice and pulp receiving chamber 104 is in fluid communication with the exterior of the rotating body 100.

A hole 108 is formed through an top end 109 of the rotating body 100. Therefore, the juice and pulp receiving chamber 104 is open at the top end 109 through which fruit and or vegetables are inserted into the juice and pulp receiving chamber 104. Pulp may also be discarded from the chamber 104.

A grater 38 (refer to FIG. 10) is fixedly mounted to a base wall 110 of the base part 102 by bolts (not shown), although alternative fixing means may be used. The grater 38 has a plurality of blades (not shown) extending upwardly into the juice and pulp receiving chamber 104.

A guide 35 (refer to FIG. 2) is disposed above and is received through the hole 108 formed through the top end 109 of the rotating body 100. The guide 35 extends into the juice and pulp receiving chamber 104. The guide 35 is cylindrical and a lower end 36 of the guide 35 is spaced from the grater 38 so that a space is provided between the grater 38 and the guide 35 so that pulp and juice can flow therebetween.

The blades (not shown) of the grater 38 face the guide 35 to grate fruit and/or vegetables inserted into the juice and pulp receiving chamber 104 through the guide 35 when the centrifugal seperator is assembled. It will be appreciated that the guide 35 is positioned above the grater 38 when the centrifugal seperator is assembled, so that fruit and/or vegetables inserted into the guide 35 are guided onto the grater 38.

The rotating body 100 defines a shell enclosing the juice and pulp receiving chamber 104. The rotating body 100 is defined by the base wall 110, the top end 109, and a side wall 112. The side wall 112 is formed by an inner side wall 113 upstanding from the base wall 110 of the base part 102 and an outer side wall 114 downwardly extending from the top end 109 of the upper part 103. The inner and outer side walls 113, 114 overlap to form the side wall 112.

The inner side wall 113 extends circumferentially around the base wall 110 and forms part of the base part 103. The outer side wall 114 extends circumferentially around the top end 109 and forms part of the upper part 103. The outer side wall 114 overlaps the inner side wall 113. Therefore, the outer side wall 114 forms an outer layer of the side wall 112 and the inner side wall 113 forms an inner layer of the side wall 112.

The inner side wall 113 includes a plurality of panel sections 115. The panel sections 115 upstand from a lower section 116 of the inner side wall 113. Alternatively, the panel sections 115 upstand from the base wall 110. The panel sections 115 are disposed in a circumferentially extending arrangement to form the inner side wall 113. The panel sections 115 are spaced from each other. The panel sections 115 extend in a direction substantially parallel to but spaced from the rotational axis of the rotating body 100.

The inner side wall 113 has an inner face 117, an outer face 118 and an upper face 119. The upper face 119 extends between the inner and outer faces 117, 118. The upper face 119 acts as an upper rim of the base part 102. The upper face 119 is defined by a peripheral edge 121 of each panel section 115, and a connecting edge 122 extending between peripheral edges 119 of adjacent panel sections 115. The outline of the peripheral edge 121 defines the profile of each panel section 115. Therefore, it will be understood that the upper face 119 of the inner side wall 113 varies in distance from the base wall 110 of the base part 102 in an axial direction extending around the base part 102.

The upper face 119 forms one of the opposing edges 106 of the elongate aperture defined between the base and upper parts 102, 103. The upper face 119 of the base part 102 defines a wave-shaped profile extending around the base part 102. That is, the distance between the upper face 119 and the lower end of the base part 102 varies in height in an axial direction as it extends around the base part 102.

Each corner of the upper face 119 is filleted, for example between each peripheral edge 121 of one of the panel sections 115 and the corresponding connecting edge 122, or chamferred, for example at the upper end of each panel section 115. In the present embodiment, the upper face 119 has a generally sinuous form, although it will be appreciated that alternative arrangements are envisaged.

Each panel section 115 has a convex inner face portion 123 (refer to FIG. 9). That is, the thickness of each panel section 115 between the inner and outer faces 117, 118 increases from the edge of each panel section 115 to a mid section of each panel section 115. Each panel section 115 has a planar outer face portion 124 (refer to FIG. 9). Protuberances 125, acting as positioning elements, extend from the outer face 118 of the inner side wall 113. In the present arrangement, the protuberances 125 extend from the outer face portion 124 of each panel section 115. Although two protuberances 125 are shown on each panel section 115, it will be understood that the number or arrangement of the protuberances 125 may vary.

A shoulder 126 extends from the outer face 118 of the inner side wall 113. The shoulder 126 extends from the lower end of the base part 103. The shoulder 126 is formed by a plurality of flanges 127 extending radially from the base part 103. The flanges 127 are spaced from each other in a circumferential arrangement. However, it will be understood that alternative arrangements are possible, for example a circumferentially extending shoulder. The shoulder 126 act as a spacer element and forms part of a spacer means to position the base and upper parts 102, 103 in a pre-determined spaced relationship with each other. Locating holes 128 are formed through the flanges 124.

The outer side wall 114 has an outer surface 130 and an inner surface 131. The inner surface 131 is generally cylindrical. A step 132 is formed in the inner surface 131. The step 132 extends around the inner surface 131 to define an upper level 133 and a lower level 134. The upper and lower levels 133, 134 are divided by the step 132. The lower level 134 is recessed in the outer side wall 114. The upper level 133 extends from the upper end of the outer side wall 114. The lower level 134 extends from the lower end of the outer side wall 114.

The step 132 acts as a lower face 135. The lower face 135 extends between the upper and lower levels 133, 134. The path of the step around the inner surface 131 of the outer side wall 114 defines a plurality of recess sections 136. The recess sections 136 are disposed around the inner surface 131 of the outer side wall 114. Each recess section 136 is arranged to receive one of the panel sections 115 of the base part 102 therein.

The recess sections 136 are disposed in a circumferentially extending arrangement around the inner surface 131 of the outer side wall 114. The recess sections 136 are elongate and extend in a direction substantially parallel to but spaced from the rotational axis of the rotating body 100. The shape of each recess section 136 is defined by the lower face 135 defined by the step. Therefore, it will be understood that the lower face 135 of the outer side wall 114 varies in distance from the top end 109 of the upper part 103 in an axial direction extending around the upper part 103. The lower level 134 of the outer side wall inner surface 131 forms a bottom surface of each recess section 136.

The lower face 135 forms one of the opposing edges 107 of the elongate aperture defined between the base and upper parts 102, 103. The lower face 135 of the upper part 103 defines a wave-shaped profile extending around the base part 103. That is, the distance between the lower face 135 and the top end of the upper part 103 varies in height in an axial direction as it extends around the upper part 103. Each corner of the lower face 135 is filleted or chamferred. In the present embodiment, the lower face 135 has a generally sinuous form, although it will be appreciated that alternative arrangements are envisaged. The path of the lower face 135 corresponds to the path of the upper face 119.

An end face 137 extends around the lower end of the outer side wall 114. The end face 137 extends between the outer surface 130 and an inner surface 131. The step 132 is spaced from the end face 137. The end face 137 acts as a spacer element and forms part of a spacer means to position the base and upper parts 102, 103 in a pre-determined spaced relationship with each other. Locating holes 138 are formed through the end face 137.

Convex inner surface portions 140 (refer to FIG. 9) are formed by the upper level 133 of the inner surface 131 of the outer side wall 114. That is, the thickness of the outer side wall 114 increases between the edges of adjacent recess sections 136. The thickness of the outer side wall 114 increases from the edge of each recess sections 136 to a mid section of each convex inner surface portion 140. Each recess section 136 has a planar bottom surface (refer to FIG. 9).

Assembly of the rotating body will now be described with reference to FIGS. 8 to 10. When the rotating body is assembled, the base and upper parts 102, 103 are brought together. The inner side wall 113 of the base part 102 is received within the upper part 103 so that the outer side wall 114 overlaps the inner side wall 113. The base part 102 is orientated so that the panel sections 115 of the inner side wall 113 are aligned with and slide into the recess sections 136 formed in the outer side wall 114.

When the base and upper parts 102, 103 are brought together the end face 137 extending around the lower end of the outer side wall 114 locates against the flanges 127 forming the shoulder 126 which extends from the outer face 118 of the inner side wall 113. The shoulder 126 and end face 137 abut against each other and act as spacer elements of the spacer means. The shoulder 126 and end face 137 are configured to position the base part 102 and upper part 103 with respect to each other in an axial direction. That is, the shoulder 126 and end face 137 are configured to space upper face 119 of the base part 102 from the lower face 135 of the upper part 103 in an axial direction. Locating rods (not shown), which form part of the spacer means, extend through the locating holes 128 in the flanges 127 and are received in the locating holes 138 in the end face 137 to position the base and upper parts 102, 103 with respect to each other and prevent the upper and base parts from rotating relative to each other about the rotational axis of the rotating body 100. The locating rods may threadingly engage in the locating holes 128 in the flanges 127 and/or the locating holes 138 in the end face 137. The locating rods may also act as mounting elements to releasably mount the base and upper parts to each other.

It will be appreciated that alternative spacer means may be used to space the upper face 119 of the base part 102 from the lower face 135 of the upper part 103. For example, a key and slot arrangement may be used to act as the spacer means. It will be understood that the spacer means or unit acts to retain the base and upper parts 102, 103 in position with respect to each other. That is the spacer means or unit prevents the base and upper parts 102, 103 from moving in an axial direction or rotating about the rotational axis of the rotating body 100. Therefore, the upper face of the base part and the lower face of the upper part are arranged to oppose each other such that they extend parallel to, but spaced from, each other by a predetermined distance. The spacer means maintains a uniform spacing between the upper face 119 of the base part 102 and the lower face 135 of the upper part 103. Therefore, the aperture 105, which acts as a fluid passage, has a uniform spacing along its length. In the present embodiment the width of the aperture 105 between the upper face 119 of the base part 102 and the lower face 135 of the upper part 103 is approximately 0.3 mm, although it will be appreciated that the width of the aperture 105 may be varied, for example the width of the aperture may be 0.1 mm. The upper face 119 of the base part 102 and the lower face 135 of the upper part 103 are spaced from each other so that the width of the aperture 105 is in the range of 0.1 mm to 0.5 mm. It will be understood that the width of the aperture 105 is dependent on the desired product to be separated and the rate at which the rotating body 100 is configured to rotate about its axis.

The protubernaces 125 extend from the outer face 118 of the inner side wall 113 and abut against the lower level 134 of the outer side wall inner surface 131. The protuberances 125 prevent the panel sections 115 of the inner side wall 113 from deflecting in a radial direction. That is, a channel 142 is formed behind each panel section 115. The channels 142 extends between the inner side wall 113 and the outer side wall 114. The channels 142 communicate from the aperture 105, acting as a fluid passage, to outside the rotating body 100. Therefore, the channels 142 allow a fluid which passes through the aperture 105 to flow from the rotating body 100. The channels 142 and the aperture 105 together form a fluid path from the juice and pulp receiving chamber 104 to outside the rotating body 100.

When the base and upper parts 102, 103 are mounted to each other the convex inner face portion 123 of each panel section 115 and the convex inner surface portions 140 formed by the upper level 133 of the inner surface 131 of the outer side wall 114 converge towards each other. Therefore, a converging mouth portion 143 is formed at the inlet to the aperture 105 which extends along the length of the aperture 105, around the rotating body 100.

Although the above embodiment has a funnel-shaped mouth 143 to the aperture 105, it will be appreciated that in an alternative embodiment the funnel shaped mouth 143 is omitted. An advantage of the funnel-shaped mouth 143 is that pulp fibres collect at the opening to the converge towards the opening to the aperture and so increases the efficiency of the cake filtration process. Another advantage is that the funnel shape guides juice toward the aperture by the centrifugal force.

Although the upper face 119 of the base part 102 and the lower face 135 are shown extending parallel to, but spaced from, each other in a radial direction it will be appreciated that in cross-section (as shown in FIG. 9) the width of the aperture may vary in a radial direction between the opening to the aperture 105 and an exit between the aperture 105 and the channel 142. Therefore, the width of the aperture 105 may increase or decrease from the opening to the exit. The width of the aperture from the opening to the exit in a radial direction may converge or diverge in a linear or non-linear manner, and so it will be understood that such cross-sectional increase or decrease in the width of the aperture may have a linear or non-linear mathematical function, as well as a continuous or discontinuous mathematical function. Alternatively, the aperture has a labyrinth arrangement in cross-section.

When the juice separator is assembled, the rotating body 100 is received in the housing 21 and the guide 35 extends into the rotating body 100. The user then operates the juice separator so that the rotating body 100 is driven by the motor 25 and rotates in the housing 21 at high speed about its vertical rotational axis.

A fruit or vegetable is inserted into the guide 35 at an upper end, and is guided onto the grater 38. As the grater 38 forms part of the rotating body 100, the grater is rotating and so the blades of the grater 38 break the inserted fruit or vegetable down to combined pulp and juice. The rotation of the body 100 causes a centrifugal force on the combined pulp and juice and urges it to move radially outwardly. Therefore, the pulp and juice flows in the juice and pulp receiving chamber 104 through a gap between the guide 35 and the grater 38 towards the side wall 112 of the rotating body 100.

The pulp is urged radially outwards due to the centrifugal force imparted on it by the rotating body 100. As the pulp flows outwardly, the converging mouth portion 143 funnels the pulp towards the opening to the aperture 105. Therefore, the mouth 143 to the aperture 105 is quickly filled with pulp and so a cake filtration process is achieved much more quickly than with a conventional sieve.

Furthermore, the funnel shaped mouth 143 provided at the opening to the aperture 105 guides the juice to the aperture, and it has been found that a single circumferentially extending aperture is sufficient to allow the juice in the juice and pulp receiving chamber 104 to flow from the chamber and out of the rotating body, without the need for further apertures. Therefore, the arrangement of the rotating body is simplified in comparison to conventional centrifugal juicers. It will be understood that in the above arrangement the length of the opening to the aperture 105 is greater than an arrangement in which the opening extends linearly around the circumference of the chamber. That is, the length of the opening is greater than the circumference of the chamber. Therefore, the area of the aperture through which a fluid is able to pass is increased without increasing the width of the opening. An advantage of this arrangement is that a greater quantity of fluid is able to pass from the juice and pulp receiving chamber without increasing the width of the opening between the opposing upper and lower faces 119, 135. Therefore, the width of the opening to the aperture 105 can be minimised to restrict any pulp from passing through the aperture 105 whilst allowing the required quantity of fluid to pass from the chamber 104. Another advantage is that juice has to travel only a short distance along the chamber to reach the aperture. If the aperture is circular and at the bottom of the wall the juice has to travel downward through the pulp for a relatively long distance whereas in the present execution this is always limited to approximately 10 mm.

As the rotating body 100 continues to rotate, pulp and juice is urged to flow in a radial direction. The pulp builds up in the funnel-shaped mouth 143, and the juice is urged to flow in a radial direction through the pulp in the funnel-shaped mouth 143. The juice then passes through the opening to the aperture 105 and along the aperture 105 between the base and upper parts 102,103. The juice passes through the aperture 105, acting as a fluid passage, and into the channel 142. The juice then passes from the channel 142 to outside the rotating body 100. Therefore, juice flows along the fluid path defined by the aperture 105 and channel 142 to outside the rotating body 100. The pulp is prevented from flowing through the aperture 105 by the existing pulp fibres collating in the funnel-shaped mouth 143, however the juice is able to flow through the pulp and through the opening of the aperture 105.

Excess pulp in the pulp and juice receiving chamber 104 collates in the pulp and juice chamber 104. Therefore, the pulp and juice are separated from each other. Alternatively, the rotating body 100 is configured to guide the excess pulp to flow upwardly along the inner surface of the chamber 104 and through the hole 108 at the upper end of the upper part 103, such that the excess pulp flows into a pulp outlet and is removed from the chamber 104 as described in the above embodiment.

When the desired amount of juice has been obtained the motor is stopped and the rotating body 100 stops rotating. The rotating body 100 is then removable from the housing 21. To clean the rotating body 100, the upper part 103 is drawn away from the base part 102. Therefore, the opposing lower face 135 of the upper part 103 and the upper face 119 of the base part 102 are separated. The faces forming the aperture are then able to be cleaned without a user needing to clean within the aperture itself. Access to the inner surface of the rotating body is also simplified. Therefore, cleaning of the rotating body 100 is simplified. Furthermore, cleaning of the channel 142 is simplified as the faces forming the channel 142 are separated from each other. Therefore, there are no passages to clean.

Although in the above embodiment the upper part 103 and base part 102 are separable, in another embodiment it will be appreciated that the upper and base parts may be integrally formed. However, an advantage of the upper and lower portions being separable is that the two portions and the aperture formed therebetween are easily cleaned.

The above embodiment may also comprise fins as described above with reference to FIG. 6.

Figure 11:
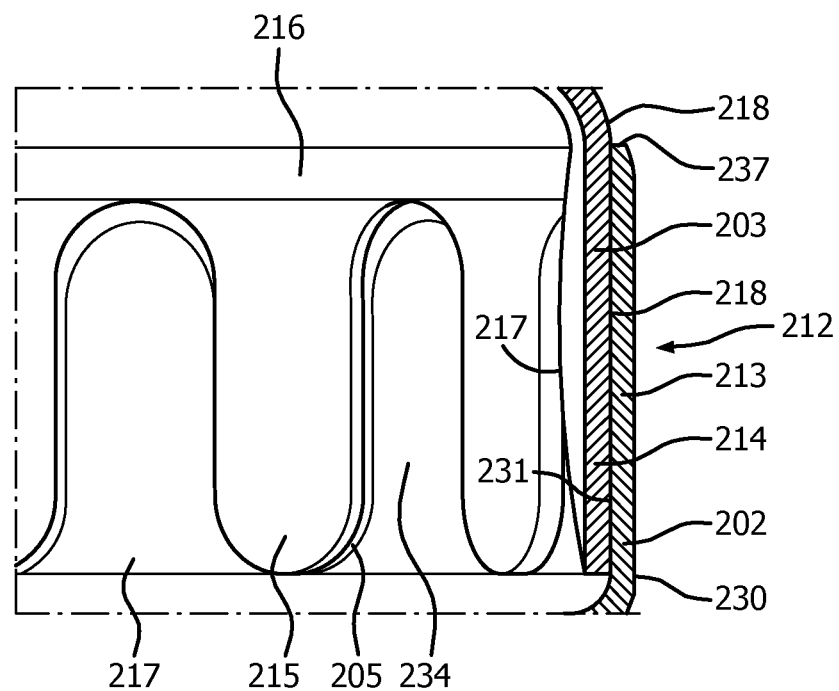
FIG. 11 shows a cross-sectional side view of part of a rotating drum of a centrifugal seperator according to a further embodiment of the invention.
Figure 12:
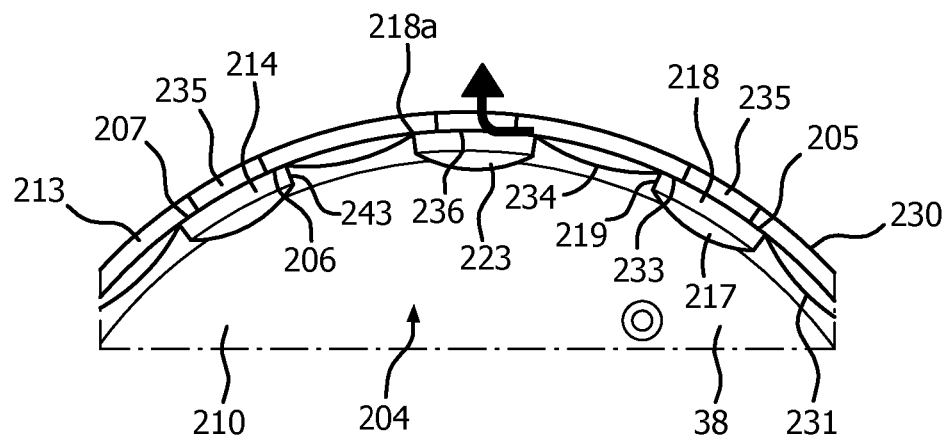
FIG. 12 shows a cross-sectional plan view of part of the rotating drum shown in FIG. 11.

Referring now to FIGS. 11 and 12, an alternative form of a rotating drum 200 for a centrifugal seperator acting as a centrifugal juicer for separating fruit or vegetable juice from pulp will now be described. Reference numerals are retained from the above-described embodiments. The arrangement and configuration of many of the components and features are generally the same as described above, and so a detailed description will be omitted herein.

Part of the rotating body or drum 200 is shown in FIGS. 11 and 12 which is arranged to be rotatably mounted in the centrifugal separator acting as a centrifugal juicer for separating fruit or vegetable juice from pulp. The centrifugal seperator is generally the same as the centrifugal seperator described above and so a detailed description will be omitted herein. The rotating body 200 is disposed in the housing 21 (refer to FIG. 2) and is removable therefrom. Therefore, cleaning of the rotating body 200 and housing is simplified. Furthermore, the rotating bodies 22, 100, 200 may be interchangably mounted in the housing.

The rotating body 200 is rotatably mounted in the housing 21 by a shaft 23 (refer to FIG. 2). The rotating body 200 is removably mounted to the shaft 23 which defines a vertical rotational axis 24. The rotating body 200 rotates about the rotational axis which extends through the centre of the rotating body 200. The shaft 23 is driven by a motor 25 in a conventional manner, so that the shaft 23, and therefore the rotating body 200, is rotated when the motor 25 is operated.

The rotating body or drum 200 comprises a base part 202 and an upper part 203. The base part 202 overlaps and extends around the upper part 203. The base and upper parts 202, 203 together form a juice and pulp receiving chamber 204.

An aperture 205 is formed between the base part 202 and the upper part 203, and extends arcuately around the rotating body 200 when the rotating body is assembled. The aperture 205 has an elongate opening which communicates the aperture 205 with the juice and pulp receiving chamber 204. The elongate opening extends circumferentially around the rotating body 200. The aperture 205 is defined by opposing faces 206, 207 of the base part 202 and upper part 203 respectively. The opposing faces 206, 207 defining the aperture 205 are spaced from each other to provide a gap therebetween. The aperture 205 acts as a fluid passage. The aperture, acting as a fluid passage, defines part of a fluid path which extends through the rotating body 200 from the juice and pulp receiving chamber 204 to the exterior of the rotating body 200. Therefore, the juice and pulp receiving chamber 204 is in fluid communication with the exterior of the rotating body 200.

As with the above embodiments a hole is formed through a top end of the rotating body 200 (not shown). Therefore, the juice and pulp receiving chamber 204 is open at the top end through which fruit and or vegetables are inserted into the juice and pulp receiving chamber 204. Pulp may also be discarded from the chamber 204.

A grater 38 (refer to FIG. 12) is fixedly mounted to a base wall 210 of the base part 202 by bolts (not shown), although alternative fixing means may be used. The grater 38 has a plurality of blades (not shown) extending upwardly into the juice and pulp receiving chamber 204.

A guide 35 (refer to FIG. 2) is disposed above and is received through the hole. The guide 35 extends into the juice and pulp receiving chamber 204. The guide 35 is cylindrical and a lower end of the guide is spaced from the grater 38 so that a space is provided between the grater 38 and the guide so that pulp and juice can flow therebetween.

The blades (not shown) of the grater 38 face the guide to grate fruit and/or vegetables inserted into the juice and pulp receiving chamber 204 through the guide 35 when the centrifugal seperator is assembled. It will be appreciated that the guide 35 is positioned above the grater 38 when the centrifugal seperator is assembled, so that fruit and/or vegetables inserted into the guide are guided onto the grater 38.

The rotating body 200 defines a shell enclosing the juice and pulp receiving chamber 204. The rotating body 200 is defined by the base wall 210, the top end (not shown), and a side wall 212. The side wall 212 is formed by an outer side wall 213 upstanding from the base wall 210 of the base part 202 and an inner side wall 214 downwardly extending from the top end of the upper part 203. The outer and inner side walls 213, 214 overlap to form the side wall 212.

The outer side wall 213 extends circumferentially around the base wall 210 and forms part of the base part 202. The inner side wall 214 extends circumferentially around the top end and forms part of the upper part 203. The inner side wall 214 overlaps the outer side wall 213. Therefore, the outer side wall 213 forms an outer layer of the side wall 212 and the inner side wall 214 forms an inner layer of the side wall 212.

The inner side wall 214 includes a plurality of panel sections 215. The panel sections 215 downwardly extend from an upper section 216 of the inner side wall 214. The panel sections 215 are disposed in a circumferentially extending arrangement to form the inner side wall 214. The panel sections 215 are spaced from each other. The panel sections 215 extend in a direction substantially parallel to but spaced from the rotational axis of the rotating body 200.

The inner side wall 214 has an inner face 217, an outer face 218 and a lower face 219. The lower face 219 extends between the inner and outer faces 217, 218. The lower face 219 acts as a lower rim of the upper part 203. An outer edge 218a between the lower face 219 and the outer face 218 defines the shape of the outer face 218. The outline of the outer edge 218a defines the profile of each panel section 215.

A peripheral portion of the outer face 218 of the inner side wall 214 extending from the outer edge 218a forms one of the opposing faces 207 of the elongate aperture defined between the base and upper parts 202, 203. The outer edge 218a defines a wave-shaped profile extending around the upper part 203. That is, the distance between the outer edge 218a of the outer face 218 and the lower end of the base part 202 varies in height in an axial direction as it extends around the base part 202. Therefore, it will be understood that the lower face 219 of the inner side wall 214 varies in distance from the upper end of the upper part 203 in an axial direction extending around the upper part 203.

Each corner of the outer edge 218a and therefore the lower face 219 is filleted or chamferred. In the present embodiment, the outer edge 218a has a generally sinuous form, although it will be appreciated that alternative arrangements are envisaged.

Each panel section 215 has a convex inner face portion 223 (refer to FIG. 12). That is, the thickness of each panel section 215 between the inner and outer faces 217, 218 increases from the edge of each panel section 215 to a mid section of each panel section 215.

Positioning elements (not shown) extend from the outer face 218 of the inner side wall 214 and are configured to locate against the outer side wall 213. Alternatively, the positioning elements (not shown) extend from the outer side wall 213 and are configured to locate against the inner side wall 214.

The outer side wall 213 has an outer surface 230 and an inner surface 231. The inner surface 231 is generally cylindrical. The inner surface 231 of the outer side wall 213 has a lower level 233 and raised sections 234 protruding from the lower level 233. The raised sections 234 form an upper level and define a convex surface extending from the inner surface 231. The raised sections 234 define a wave-shaped path extending circumferentially around the outer side wall 213. The lower level 233 of the inner surface 231 forms a plurality of recess sections 236. Each recess section 236 is arranged to receive one of the panel sections 215 of the inner side wall 214 therein.

The recess sections 236 are disposed in a circumferentially extending arrangement around the inner surface 231 of the outer side wall 213. The recess sections 236 are elongate and extend in a direction substantially parallel to but spaced from the rotational axis of the rotating body 200. The shape and spacing of the recess sections 236 corresponds to the shape and spacing of the panel sections 215. The lower level 233 of the outer side wall inner surface 231 forms one of the opposing faces 206 of the elongate aperture defined between the base and upper parts 202, 203.

Channels 235 (refer to FIG. 12) are formed through the outer side wall 213. The channels 235 extend between the lower level 233 of the outer side wall inner surface 231 and the outer surface 230 of the outer side wall 213. The channels 235 communicate from the aperture 205, acting as a fluid passage, to outside the rotating body 200. Therefore, the channels 235 allow a fluid which passes through the aperture 205 to flow from the rotating body 200. The channels 235 and the aperture 205 together form a fluid path from the juice and pulp receiving chamber 204 to outside the rotating body 200. Each channel 235 is elongate and extends in an axial direction along the outer side wall 213. It will be understood that alternative channel arrangements are envisaged. Each channel 235 is covered by the inner side wall 213 when the rotating body 200 is assembled so that the channels are not exposed to the juice and pulp receiving chamber 204. Therefore, the channels are not in direct communication with the juice and pulp receiving chamber 204. However, it will be understood that the channels 235 are in fluid communication with the juice and pulp receiving chamber 204 via the aperture 205.

An end face 237 extends around the upper end of the outer side wall 213. The end face 237 extends between the outer surface 230 and the inner surface 231. The end face 237 acts as a spacer element and forms part of a spacer means to position the base and upper parts 202, 203 in a pre-determined spaced relationship with each other.

A shoulder (not shown) extends from the outer face 218 of the inner side wall 213. The shoulder extends from the upper end of the upper part 203. The shoulder acts as a spacer element and forms part of the spacer means together with the end face 237 to position the base and upper parts 202, 203 in a pre-determined spaced relationship with each other.

Assembly of the rotating body will now be described with reference to FIGS. 11 and 12. When the rotating body is assembled, the base and upper parts 202, 203 are brought together. The inner side wall 214 of the upper part 203 is received within the lower part 203 so that the outer side wall 213 overlaps the inner side wall 214. The base part 202 is orientated so that the panel sections 215 of the inner side wall 214 are aligned with and slide into the recess sections 236 defined by the outer side wall 213.

When the base and upper parts 202, 203 are brought together the end face 237 extending around the upper end of the outer side wall 213 locates against the shoulder (not shown) extending from the outer face 218 of the inner side wall 214. The shoulder and end face 237 abut against each other and act as spacer elements of the spacer means. The shoulder (not shown) and end face 237 are configured to position the base part 202 and upper part 203 with respect to each other in an axial direction. That is, the shoulder (not shown) and end face 237 are configured to locate the panel sections 215 of the inner side wall 214 in the recess sections 236 defined by the outer side wall 213 in a predetermined position in the axial direction. Locating elements (not shown), which form part of the spacer means, extend between the base and upper parts 202, 203 to locate and position the base and upper parts 202, 203 with respect to each other and prevent the upper and base parts 202, 203 from rotating relative to each other about the rotational axis of the rotating body 200. The locating elements may also act as mounting elements to releasably mount the base and upper parts 202, 203 to each other.

It will be appreciated that alternative spacer means may be used to space the base part 202 from the upper part 203. For example, a key and slot arrangement may be used to act as the spacer means. It will be understood that the spacer means or unit acts to retain the base and upper parts 202, 203 in position with respect to each other. That is the spacer means or unit restricts the base and upper parts 202, 203 from moving in an axial direction or rotating about the rotational axis of the rotating body 200. Therefore, the upper face of the base part and the lower face of the upper part are arranged to oppose each other such that they extend parallel to, but spaced from, each other by a predetermined distance. The spacer means maintains a uniform spacing between the base part 202 and the upper part 203. The positioning elements (not shown) may also form part of the spacer means. The positioning elements act to maintain the spacing between the inner surface 233 of the outer part 202 and the outer face 218 of the inner part 203. Therefore, the aperture 205, which acts as a fluid passage, has a uniform spacing between its opposing faces 206, 207 along its length. In the present embodiment the width of the aperture 205 between the inner surface 233 of the outer part 202 and the outer face 218 of the inner part 203 is approximately 0.3 mm. The inner surface 233 of the outer part 202 and the outer face 218 of the inner part 203 are spaced from each other so that the width of the aperture 205 is in the range of 0.1 mm to 0.5 mm. It will be understood that the width of the aperture 205 is dependent on the desired product to be separated and the rate at which the rotating body 100 is configured to rotate about its axis.

The positioning elements extend from the outer face 218 of the inner side wall 214 and/or the inner surface 231 of the outer side wall 213. The positioning elements space the outer face 218 of the inner side wall 214 and the inner surface 231 of the outer side wall 213 from each other. The width of the aperture 205 between its opposing faces 206, 207 is determined by the spacing between the outer face 218 of the inner side wall 214 and the inner surface 231 of the outer side wall 213. The positioning elements may also prevent the panel sections 215 of the inner side wall 214 from deflecting in a radial direction. The aperture 205, acting as a fluid passage, communicates the juice and pulp receiving chamber 204 with the channels 235 formed through the outer side wall 213. Therefore, the channels 235 allow a fluid which passes through the aperture 205 to flow from the rotating body 200. The channels 235 and the aperture 205 together form a fluid path from the juice and pulp receiving chamber 204 to outside the rotating body 200.

When the base and upper parts 202, 203 are mounted to each other, the convex inner face portion 223 of each panel section 215 slopes towards the opening to the aperture 205. That is, the thickness of the inner side wall 214 decreases towards the opening to the aperture 205. Similarly, the convex surface of the raised sections 234 form on the inner surface 231 of the outer side wall 213 slope towards the opening to the aperture 205. That is, the thickness of the outer side wall 213 decreases towards the opening to the aperture 205. The lower face 219 of the inner side wall 214 also extends radially towards the opening to the aperture 205. Therefore, a converging mouth portion 243 is formed at the opening to the aperture 205. The converging mouth portion 243 extends along the length of the aperture 205, around the rotating body 200.

Although the above embodiment has a funnel-shaped mouth 243 to the aperture 205, it will be appreciated that in an alternative embodiment the funnel shaped mouth 243 is omitted. An advantage of the funnel-shaped mouth 243 is that pulp fibres collect at the opening to the converge towards the opening to the aperture and so increases the efficiency of the cake filtration process.

Although the opposing faces 206, 207 of the aperture 205 are shown extending parallel to, but spaced from, each other in a circumferential direction away from the opening to the aperture 205, it will be appreciated that in cross-section the width of the aperture may vary between the opening to the aperture 205 and an exit between the aperture 205 and the channel 235. Therefore, the width of the aperture 205 may increase or decrease from the opening to the exit. The width of the aperture from the opening to the exit in a radial direction may converge or diverge in a linear or non-linear manner, and so it will be understood that such cross-sectional increase or decrease in the width of the aperture may have a linear or non-linear mathematical function, as well as a continuous or discontinuous mathematical function. Alternatively, the aperture has a labyrinth arrangement in cross-section.

When the juice separator is assembled, the rotating body 200 is received in the housing 21 and the guide 35 extends into the rotating body 200. The user then operates the juice separator so that the rotating body 200 is driven by the motor 25 and rotates in the housing 21 at high speed about its vertical rotational axis.

A fruit or vegetable is inserted into the guide 35 at an upper end, and is guided onto the grater 38. As the grater 38 forms part of the rotating body 200, the grater is rotating and so the blades of the grater 38 break the inserted fruit or vegetable down to combined pulp and juice. The rotation of the body 200 causes a centrifugal force on the combined pulp and juice and urges it to move radially outwardly. Therefore, the pulp and juice flows in the juice and pulp receiving chamber 204 through a gap between the guide 35 and the grater 38 towards the side wall 212 of the rotating body 200.

The pulp is urged radially outwards due to the centrifugal force imparted on it by the rotating body 200. As the pulp flows outwardly, the converging mouth portion 243 funnels the pulp towards the opening to the aperture 205. Therefore, the mouth 243 to the aperture 205 is quickly filled with pulp and so a cake filtration process is achieved much more quickly than with a conventional sieve.

Furthermore, the funnel shaped mouth 243 provided at the opening to the aperture 205 guides the juice to the opening to the aperture 205, acting as a fluid passage, and it has been found that a single circumferentially extending aperture allows the juice in the juice and pulp receiving chamber 204 to flow from the chamber and out of the rotating body, without the need for further apertures. Therefore, the arrangement of the rotating body is simplified in comparison to conventional centrifugal juicers. It will be understood that in the above arrangement the length of the opening to the aperture 205 is greater than an arrangement in which the opening extends linearly around the circumference of the chamber. That is, the length of the opening is greater than the circumference of the chamber. Therefore, the area of the fluid passage through which a fluid is able to pass is increased without increasing the width of the opening to the aperture 205. An advantage of this arrangement is that a greater quantity of fluid is able to pass from the juice and pulp receiving chamber without increasing the width of the opening between the opposing upper and lower faces 206, 207. Therefore, the width of the opening to the aperture 205 can be minimised to restrict any pulp from passing through the aperture 205 whilst allowing the required quantity of fluid to pass from the chamber 204.

As the rotating body 200 continues to rotate, pulp and juice is urged to flow in a radial direction. The pulp builds up in the funnel-shaped mouth 243, and the juice is urged to flow in a radial direction through the pulp in the funnel-shaped mouth 143. The juice then passes through the opening to the aperture 205 and along the aperture 205 between the base and upper parts 202,203. The juice passes through the aperture 205, acting as a fluid passage, in a circumferential direction and into the channel 235. The juice then passes from the channel 235 to outside the rotating body 200. Therefore, juice flows along the fluid path defined by the aperture 205 and channel 235 to outside the rotating body 200. The pulp is prevented from flowing through the aperture 205 by the width of the aperture and by the existing pulp fibres collating in the funnel-shaped mouth 243, however the juice is able to flow through the pulp and through the opening of the aperture 205.

Excess pulp in the pulp and juice receiving chamber 204 collates in the pulp and juice chamber 204. Therefore, the pulp and juice are separated from each other. Alternatively, the rotating body 200 is configured to guide the excess pulp to flow upwardly along the inner surface of the chamber 204 and through a hole at the upper end of the upper part 203, such that the excess pulp flows into a pulp outlet and is removed from the chamber 204, as described in the above embodiment.

When the desired amount of juice has been obtained the motor is stopped and the rotating body 200 stops rotating. The rotating body 200 is then removable from the housing 21. To clean the rotating body 200, the upper part 203 is drawn away from the base part 202. Therefore, the opposing inner surface 231 of the base part 202 and the outer face 218 of the upper part 203 are separated. The faces 206, 207 forming the aperture are then separated from each other and are able to be cleaned without a user needing to clean within the aperture itself. Access to the inner surface of the rotating body is also simplified. Therefore, cleaning of the rotating body 200 is simplified.

Although in the above embodiment the upper part 203 and base part 202 are separable, in another embodiment it will be appreciated that the upper and base parts may be integrally formed. However, an advantage of the upper and lower portions being separable is that the two portions and the aperture formed therebetween are easily cleaned.

The above embodiment may also comprise fins as described above with reference to FIG. 6.

Although in the above embodiments the elongate opening to the aperture, together with the aperture, extends circumferentially around the rotating body, it will be understood that the alternative arrangements are possible. For, example, the rotating body may have a plurality of apertures or openings which are separated from each other. In an alternative arrangement, the opening may be divided into discrete portions which are spaced from each other. Seperating elements may be disposed along the aperture to divide the aperture into different aperture portions.

Although in the above embodiment the spacer means is formed by the shoulder and the end face it will be understood that alternative arrangements are possible. For example, in an alternative arrangement spacer elements may extend from one or both of the upper face of the base part or the lower face of the upper part to locate against the opposing lower or upper face. Alternatively one or more portions of one or both of the upper face of the base part or the lower face of the upper part may be configured to locate against the opposing lower or upper face, or other portion of the base part or upper part.

Although the above exemplary embodiment relates to a centrifugal juicer for separating juice from pulp, it will be appreciated that the invention is not limited thereto and that such an above described apparatus may be used to separate other combined liquids and solids. For example, the above described apparatus may form part of a soy milk maker.

It will also be understood that the shape of the rotating body or drum of the embodiments shown in FIGS. 8 to 10 and described above is not limited to a cylindrical shape. For example, the rotating bodies shown in FIGS. 8 to 10 and comprising a base part and an upper part may be executed as a barrel-shaped body or a conically-shaped body. In each arrangement the base and upper parts are configured to overlap to form a juice and pulp receiving chamber 104 with an elongate aperture extending along the body.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claims in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A centrifugal separator for separating fruit or vegetable juice from fruit or vegetable pulp without a sieve with perforations, the centrifugal separator comprising:
   a body configured to rotate about a central axis;
   a chamber formed by the body for receiving pulp and juice, wherein the chamber comprises an upper part and a base part; and
   an elongate aperture defined by a continuous opening (i) positioned between the upper part and the base part of the chamber at an outer periphery of the body and (ii) extending from an inner surface to an outer surface of the body and arcuately around the body, wherein the elongate aperature is configured with a funnel shaped mouth portion for capturing fibers of pulp in a cake filtration process at the elongate aperture that prevents pulp in the chamber from flowing through the elongate aperture while allowing juice in the chamber to flow through the elongate aperture in response to the body being rotated about the central axis, wherein a path of the elongate aperture around the body has a wave-shaped profile in a sinuous form.

2. The centrifugal separator according to claim 1, wherein the elongate aperture extends circumferentially around the body.

3. The centrifugal separator according to claim 1, wherein at least a portion of the elongate aperture extends in a direction having an axial component along the body.

4. The centrifugal seperator according to claim 3, wherein at least a portion of the elongate aperture extends in an axial direction along the body.

5. The centrifugal separator according to claim 1, wherein the upper part of the body comprises a first part and the base part of the body comprises a second part, wherein the first part and the second part are separable along the elongate aperture.

6. The centrifugal separator according to claim 5, wherein a face of the first part and a face of the second part are configured to be spaced from each other to form the elongate aperture.

7. The centrifugal seperator according to claim 6, wherein the face of the first part and the face of the second part are configured so that a path of fluid through the elongate aperture is in a substantially radial direction or in a substantially circumferential direction.

8. The centrifugal seperator according to claim 7, wherein a section of the first part overlaps a section of the second part.

9. The centrifugal seperator according to claim 6, wherein the elongate aperture communicates with a channel configured to guide juice from the elongate aperture to outside the body.

10. The centrifugal seperator according to claim 9, wherein the channel is at least one of (i) formed between the first part and the second part and (ii) formed through the second part.

11. The centrifugal separator according to claim 5, wherein the second part converges inwardly from a lower end proximate the first part to an upper end of the second part.

12. The centrifugal separator according to claim 1, further comprising a stationary fin mounted in the chamber formed by the body, wherein an edge of the fin is configured to scrape an inner surface of the body.

13. A juicer for extracting fruit and or vegetable juice from fruit or vegetable pulp comprising a centrifugal separator according to claim 1.

* * * * *